United States Patent
Blattert et al.

(10) Patent No.: US 10,710,564 B2
(45) Date of Patent: Jul. 14, 2020

(54) METHOD FOR ADJUSTING THE BRAKE PEDAL COUNTER FORCE IN A VEHICLE

(71) Applicant: Robert Bosch GmbH, Stuttgart (DE)

(72) Inventors: Dieter Blattert, Kirchheim/Neckar (DE); Helmut Wolff, Untergruppenbach (DE)

(73) Assignee: Robert Bosch GmbH, Stuttgart (DE)

( * ) Notice: Subject to any disclaimer, the term of this patent is extended or adjusted under 35 U.S.C. 154(b) by 270 days.

(21) Appl. No.: 15/370,136

(22) Filed: Dec. 6, 2016

(65) Prior Publication Data
US 2017/0174196 A1 Jun. 22, 2017

(30) Foreign Application Priority Data

Dec. 16, 2015 (DE) .......................... 10 2015 225 437
Apr. 11, 2016 (DE) .......................... 10 2016 205 990

(51) Int. Cl.
*B60T 8/40* (2006.01)
*B60T 13/74* (2006.01)
*B60T 8/48* (2006.01)
*B60T 7/04* (2006.01)
*B60T 8/32* (2006.01)

(52) U.S. Cl.
CPC ............ *B60T 8/4086* (2013.01); *B60T 7/042* (2013.01); *B60T 8/4872* (2013.01); *B60T 13/741* (2013.01); *B60T 13/745* (2013.01); *B60T 8/32* (2013.01)

(58) Field of Classification Search
CPC ...... B60T 8/4086; B60T 7/042; B60T 8/4872; B60T 13/745; B60T 8/32
See application file for complete search history.

(56) References Cited

U.S. PATENT DOCUMENTS

| 2,924,945 | A | * | 2/1960 | Oswalt | F16D 65/74 188/152 |
| 3,216,771 | A | * | 11/1965 | Giuseppe | B60T 8/00 303/49 |
| 4,075,848 | A | * | 2/1978 | Ueda | B60T 13/148 60/547.1 |
| 4,730,877 | A | * | 3/1988 | Seibert | B60T 7/042 188/358 |
| 5,152,587 | A | * | 10/1992 | Volz | B60T 8/32 303/113.3 |
| 2014/0277981 | A1 | * | 9/2014 | Svensson | B60T 7/042 701/70 |
| 2015/0375726 | A1 | * | 12/2015 | Roll | B60T 8/4081 303/3 |

FOREIGN PATENT DOCUMENTS

| DE | 10 2004 004 992 A1 | 9/2005 |
| DE | 10 2006 055 766 A1 | 10/2007 |
| DE | 10 2007 030 441 A1 | 1/2009 |

* cited by examiner

*Primary Examiner* — Thomas J Williams
*Assistant Examiner* — James K Hsiao
(74) *Attorney, Agent, or Firm* — Maginot, Moore & Beck LLP

(57) ABSTRACT

A method for adjusting the brake pedal counter force in a vehicle with a hydraulic vehicle brake and an electromechanical brake device includes modulating the brake pressure during the simultaneous operation of the hydraulic vehicle brake and the electromechanical brake device such that the brake pedal counter force follows a predetermined target profile.

13 Claims, 3 Drawing Sheets

METHOD FOR ADJUSTING THE BRAKE PEDAL COUNTER FORCE IN A VEHICLE

This application claims priority under 35 U.S.C. § 119 to patent application nos. DE 10 2015 225 437.2, filed on Dec. 16, 2015 in Germany, and DE 10 2016 205 990.4, filed on Apr. 11, 2016, the disclosures of which are incorporated herein by reference in their entirety.

BACKGROUND

The disclosure concerns a method for adjusting the brake pedal counter force in a vehicle with a brake system, in which both a hydraulic vehicle brake and also an electromechanical brake device displace a brake piston for producing a braking force.

A parking brake system is known from DE 10 2004 004 992 A1 with an electric brake motor, by means of which a brake piston is displaced against a brake disk to produce a clamping force holding the vehicle at a standstill. The parking brake system is integrated within the hydraulic wheel brake and the brake piston is also applied against the brake disk by the hydraulic brake fluid.

In DE 10 2006 055 766 A1, a combined vehicle brake system is described that comprises a hydraulic brake system on the front axle of the vehicle and an electromechanical brake system on the rear axle. The vehicle is driven by an electric motor that can be operated as a generator to recover braking energy. The braking torque of the electric motor that arises during this adds to the braking torque that is produced by the hydraulic brake system and the electromechanical brake system. In order to give the driver a natural or customary braking feel, the inlet and outlet valves in the hydraulic brake system are switched so that a defined force-travel characteristic is imposed on the travel at the brake pedal.

A vehicle brake system comparable with DE 10 2006 055 766 A1 is also known from DE 10 2007 030 441 B4.

SUMMARY

Using the method according to the disclosure, the brake pedal counter force can be adjusted in a brake system in which both a hydraulic vehicle brake and also an electromechanical brake device, which comprises an electric brake motor, act upon the same brake piston and displace said brake piston against a brake disk. During the simultaneous operation of a hydraulic vehicle brake by means of the brake pedal and by means of the electric brake motor of the electromechanical brake device, the brake pedal counter force is automatically modulated by an electrically controlled actuator in such a way that the brake pedal counter force follows a predetermined target profile or a predetermined characteristic. The simultaneous operation of the hydraulic vehicle brake and the electromechanical brake device, both of which act on the same brake piston, is thus a prerequisite for the automatic adjustment of the brake pedal counter force.

In said braking situation, the brake piston is displaced towards the brake disk by the electric brake motor, wherein the brake piston displacement relieves the load on the hydraulic system of the vehicle brake by the increase in volume, which accompanies a decrease in pressure in the brake line. The decrease in pressure is detected at the brake pedal by the driver without the intervention according to the disclosure, because the brake pedal covers an additional travel at a constant braking force of the driver. Using the method according to the disclosure, by contrast the brake pedal force is automatically modulated in such a way that the brake pedal counter force will deviate from the usual profile and a target profile for the brake pedal counter force is adjusted instead.

Said procedure enables, for example, the brake pedal counter force to be adjusted so that it remains the same despite the increase in volume in the hydraulic brake system, so that the brake pedal does not cover any additional travel for the same driver operation, but remains in the current position thereof. However, other processes of the brake pedal counter force are also possible. For example, by means of the profile the brake pedal counter force signals the driver haptically that the electromechanical brake device has been activated in addition to the hydraulic vehicle brake, for example by means of a pulsating profile of the brake pedal counter force. In the case of using the electromechanical brake device as a parking brake, by means of the brake pedal counter force it can be signaled to the driver that the clamping process has been achieved by the electromechanical brake device and thereby the target parking braking force has been reached, for example likewise by means of a pulsation of the brake pedal counter force. It is also possible to perform a harder or a softer characteristic curve compared to the profile of the brake pedal counter force without intervention by means of the method according to the disclosure, for example in order to reduce or increase the displacement of the brake pedal.

Influencing the brake pedal counter force can be carried out both during a clamping process, in which a braking force is produced, and also during a releasing process, in which the braking force is reduced.

The electromechanical brake device is in particular used for adjusting a parking brake force of the parked vehicle. Accordingly, the method is preferably carried out below a speed limit value of for example 5 km/h, 10 km/h or 15 km/h or with the vehicle at a standstill. It is however also possible to carry out the method at higher speeds and to use the electromechanical brake device to produce a braking force to reduce the speed of the vehicle in addition to the hydraulic vehicle brake.

The modulation of the hydraulic brake pressure can be carried out in different ways. It is for example possible to actuate a hydraulic pump as an actuator in the hydraulic brake circuit, for example a hydraulic pump of an electronic stability program (ESP). In general, actuators in the hydraulic vehicle brake that are automatically modulated to influence the brake pedal counter force are considered. The actuator can also be an electrically adjustable brake force booster in addition to or as an alternative to a hydraulic pump, for example an electric motor that is operated to produce a hydraulic braking force (iBooster), which advantageously sits directly on the master brake cylinder of the hydraulic vehicle brake and converts the brake pedal displacement into a boosted displacement of the piston of the master brake cylinder.

According to a further advantageous implementation, the target profile of the brake pedal counter force can be predetermined by the driver. For example, by means of an input unit in the vehicle, for example on the on-board computer, a target behavior chosen by the driver can be selected or specified. This enables the target behavior of the brake pedal counter force to be individualized and matched to the respective driving mode.

According to yet another advantageous implementation, the volumetric flow of the hydraulic brake fluid that is produced by the operation of the electric brake motor is detected and analyzed. The volumetric flow of the hydraulic brake fluid is produced by the change of volume during the piston displacement by the electric brake motor. The volumetric flow during the clamping process results in the decrease in pressure in the hydraulic vehicle brake and the lowering of the brake pedal, which can be compensated by means of the modulation of the brake pedal counter force. During the release process, by contrast, the pressure as well as the brake pedal counter force are increased owing to the reduction in volume in the working chamber of the brake piston in the hydraulic brake circuit.

The individual steps of the method run in a regulation or control unit, in which control signals are produced for actuating the different components of the brake system with the hydraulic vehicle brake, including the actuator and the electromechanical brake device with the electric brake motor. The brake system comprises both the hydraulic vehicle brake and also the electromechanical brake device.

BRIEF DESCRIPTION OF THE DRAWINGS

Further advantages and advantageous implementations are to be found in the further claims, the description of the figures and the illustrations. In the figures:

In the figures, the same components are provided with the same reference characters.

DETAILED DESCRIPTION

Figure 1:
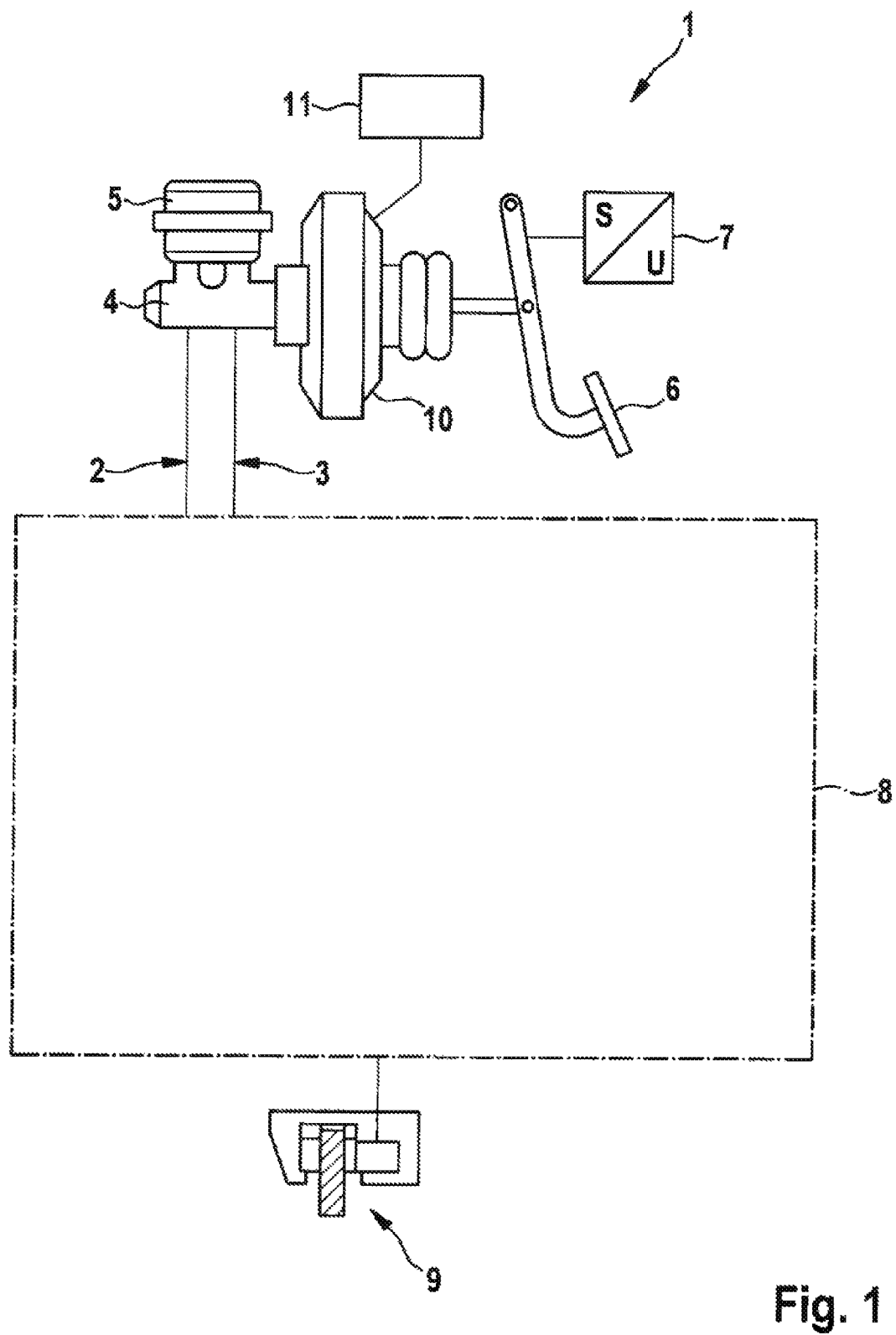
FIG. 1 shows a schematic representation of a with a hydraulic vehicle brake with a brake force booster forming an actuator, wherein the wheel brake devices of the vehicle brake on the rear axle of the vehicle are additionally implemented as an electromechanical brake device with an electric brake motor.

The hydraulic vehicle brake 1 for a vehicle represented in FIG. 1 comprises a front axle brake circuit 2 and a rear axle brake circuit 3 for supplying and actuating wheel brake devices 9 on each wheel of the vehicle with a brake fluid under hydraulic pressure. The two brake circuits 2, 3 are connected to a common master brake cylinder 4 that is supplied with brake fluid by means of a brake fluid reservoir container 5. The piston of the master brake cylinder within the master brake cylinder 4 is operated by the driver by means of the brake pedal 6 and the pedal travel exerted by the driver is measured by means of a pedal travel sensor 7. Between the brake pedal 6 and the master brake cylinder 4 there is a brake force booster 10, which for example comprises an electric motor, which is preferably operated by means of a gearbox of the master brake cylinder 4 (iBooster). The brake force booster 10 forms an electrically controllable actuator for influencing the brake pressure.

The actuating movement of the brake pedal 6 that is measured by the pedal travel sensor 7 is transmitted as a sensor signal to a regulation or control unit 11, in which control signals for actuating the braking force booster 10 are produced. The supply of the wheel brake devices 9 with brake fluid is carried out in each brake circuit 2, 3 by means of different switching valves, which in common with further assemblies are part of the brake hydraulics 8. Furthermore, the brake hydraulics 8 comprise a hydraulic pump that is a component of an electronic stability program (ESP).

Figure 2:
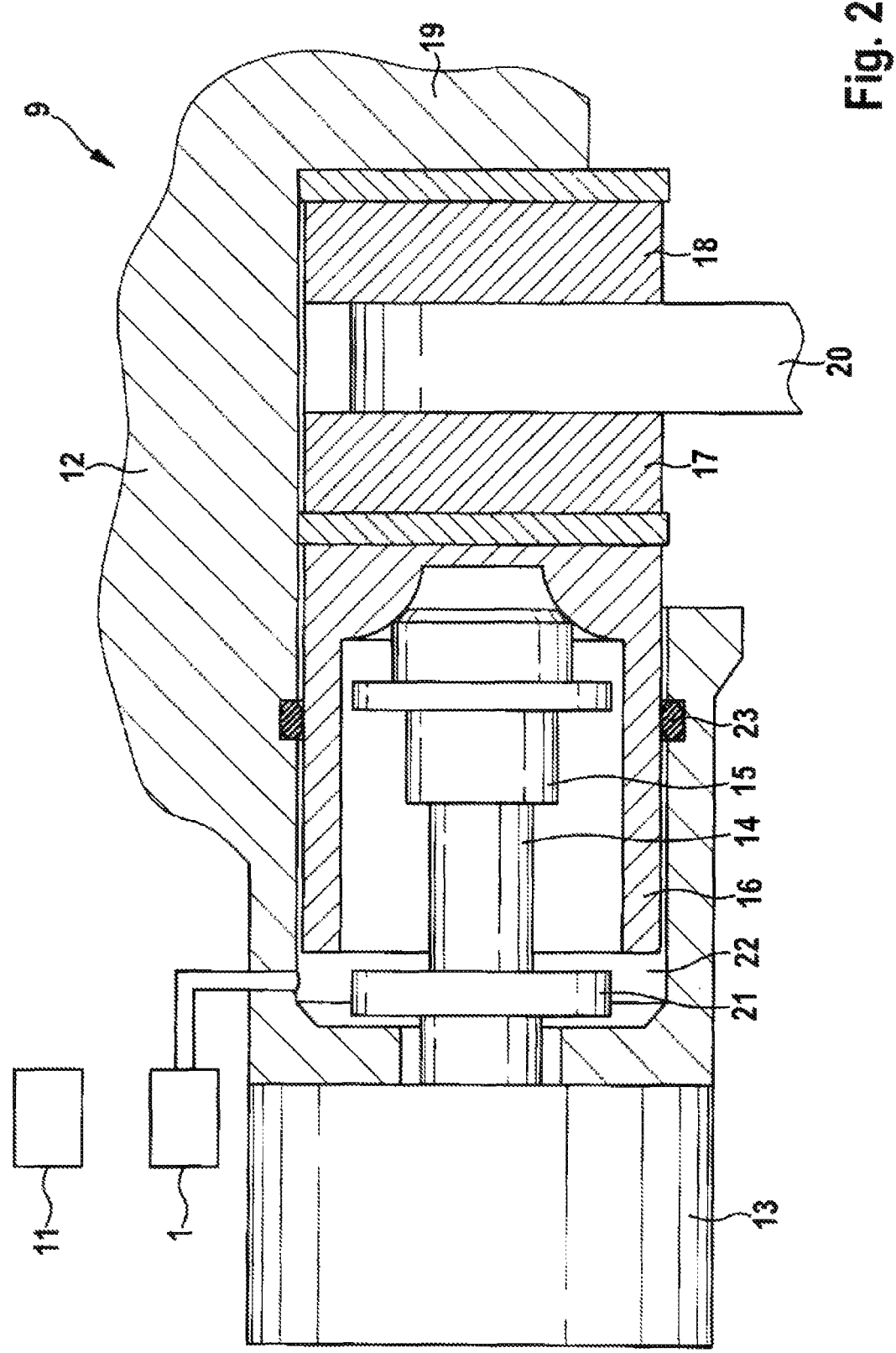
FIG. 2 shows a section through an electromechanical brake device with an electric brake motor.

In FIG. 2, the wheel brake device 9 that is disposed on a wheel on the rear axle of the vehicle is represented in detail. The wheel brake device 9 is part of the hydraulic vehicle brake 1 and is supplied with brake fluid 22 from the rear axle brake circuit. The wheel brake device 9 comprises moreover an electromechanical brake device, which is preferably used for holding a vehicle at a standstill, but can also be used for braking the vehicle during movement of the vehicle, in particular at low vehicle speeds below a speed limit value.

The electromechanical brake device comprises a brake caliper 12 with a claw 19 that engages around a brake disk 20. As the final control element, the brake device comprises a direct current electric motor as a brake motor 13, the rotor shaft of which drives a spindle 14 in rotation, on which a spindle nut 15 is rotatably supported. During rotation of the spindle 14, the spindle nut 15 is displaced axially. The spindle nut 15 moves within a brake piston 16 that is the support for a brake lining 17 that is pressed against the brake disk 20 by the brake piston 16. On the opposite side of the brake disk 20 there is a further brake lining 18 that is fixedly mounted on the claw 19. The brake piston 16 is sealed flow tight on the outer side thereof relative to the accommodating housing by means of an enveloping sealing ring 23.

During rotation of the spindle 14, the spindle nut 15 can move axially forwards within the brake piston 16 towards the brake disk 20, or can move axially rearwards until reaching a stop 21 during an opposite rotation of the spindle 14. To produce a clamping force, the spindle nut 15 acts on the inner face of the brake piston 16, whereby the brake piston 16, which is axially movably supported in the brake device, is pressed with the brake lining 17 against the facing end face of the brake disk 20.

For the hydraulic braking force, the hydraulic pressure of the brake fluid 22 from the hydraulic vehicle brake 1 acts on the brake piston 16. The hydraulic pressure can also be effectively supportive when the vehicle is at a standstill during operation of the electromechanical brake device, so that the total braking force is composed of the portion provided by the electric motor and the hydraulic portion. While the vehicle is travelling, either only the hydraulic vehicle brake is active or both the hydraulic vehicle brake and also the electromechanical brake device are active or only the electromechanical brake device is active to produce a braking force. The control signals for actuating both the adjustable components of the hydraulic vehicle brake 1 and also the electromechanical wheel brake device 9 are produced in the regulation or control unit 11.

Figure 3:
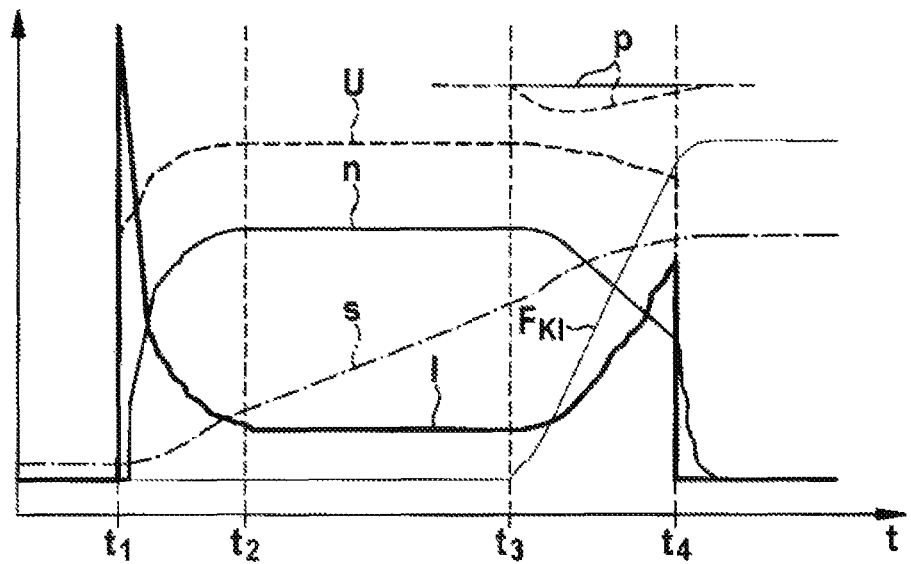
FIG. 3 shows a graph with time-dependent state variables of the electromechanical brake device during clamping.

In FIG. 3 a graph with the current profile I, the voltage U and the revolution rate profile n of the electric brake motor are represented against time for a clamping process with a build-up of braking force. Furthermore, in FIG. 3 the electromechanical clamping force $F_{K1}$ that is produced by the electric brake motor is plotted, as well as the distance s traveled by the brake motor or a final control element acted upon by the brake motor during the clamping process. Moreover, the profile of the hydraulic brake pressure p during the build-up of brake pressure is represented in the non-compensated state (dashed line) and in the compensated state (solid line).

At the point in time t1, the clamping process starts by applying an electrical voltage and energizing the brake motor with the circuit closed. The starting phase (phase I) lasts from the point in time t1 until the point in time t2. At the point in time t2, the voltage U and the revolution rate of the motor n have reached the maxima thereof. The phase between t2 and t3 constitutes the idle phase (phase II), in which the current I moves at a minimum level. This is followed from the point in time t3 by the force build-up phase (phase III) until the point in time t4, at which the brake lining is in contact with the brake disk and is pressed with increasing clamping force $F_{K1}$ against the brake disk. At the point in time t4, the switch-off of the electric brake motor is carried out by opening the electrical circuit, so that the revolution rate n of the brake motor decreases to zero in the further profile. The brake motor may additionally be braked to a standstill by means of a switched short-circuit of the motor cables.

The force increase point coincides with the phase of the force build-up at the point in time t3. The force build-up or the profile of the clamping force $F_{K1}$ can be determined for example using the profile of the current I of the brake motor, which basically has the same profile as the electromechanical clamping force. Starting from the low level during the idle phase between t2 and t3, the current profile rises steeply at the start of the point in time t3. Said rise of the current can be detected and used to determine the force increase point. In principle, however, the profile of the force build-up can also be determined from the voltage or revolution rate profile or from an arbitrary combination of the signals for current, voltage and revolution rate.

The hydraulic brake pressure p reduces in the non-compensated state according to the dashed line once the force build-up phase starts at the point in time $t_3$. The reason for the reduction of the hydraulic pressure p lies in the increase in volume of the hydraulic system, caused by the axial displacement of the brake piston 16 by the electromechanical wheel brake device 9. The reduction of the brake pressure p also results in a reduction of the brake pedal counter force in the brake pedal, which is noticed by the driver by the brake pedal yielding, even if the pedal force exerted by the driver is not increased.

In order to prevent driver irritation by said behavior of the brake pedal, the brake pedal counter force can be adjusted so that yielding of the brake pedal is avoided. This is carried out by increasing the hydraulic pressure p in the hydraulic vehicle brake, so that, as shown in FIG. 3, the brake pressure p maintains the constant value represented by the solid line. In order to implement this, an electrically controllable actuator in the hydraulic vehicle brake is operated, for example a hydraulic pump of an ESP system, so that a constant brake pressure p is achieved instead of the reduction according to the dashed line. Accordingly, the brake pedal counter force also does not change.

Figure 4:
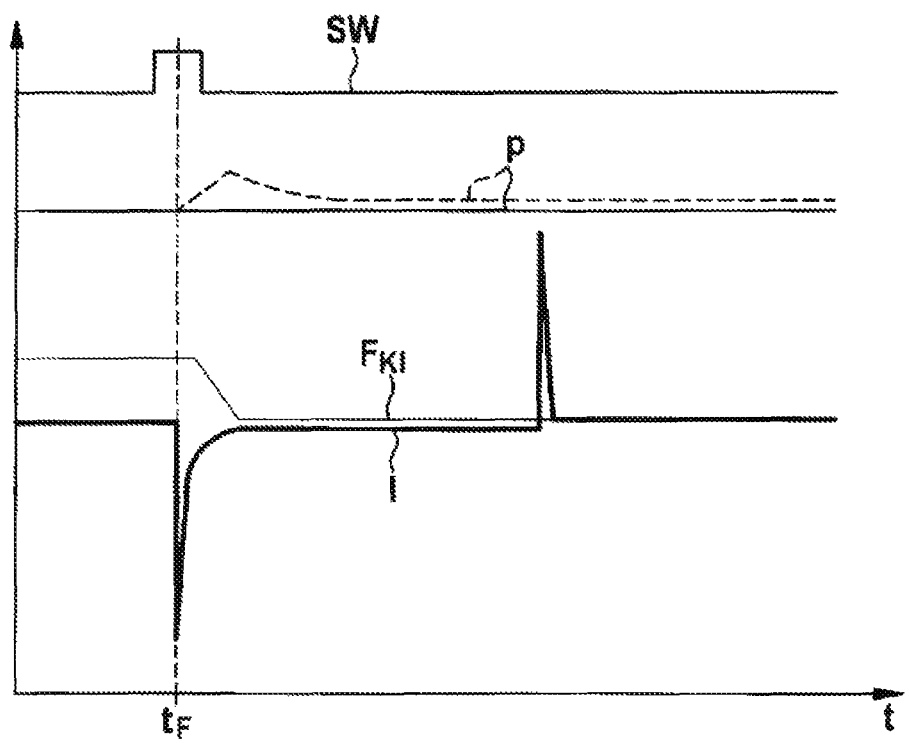
FIG. 4 shows a graph with time-dependent state variables of the electromechanical brake device during opening.

In FIG. 4 a further graph is shown with the time-dependent profile of the clamping force $F_{K1}$, of the current I as well as of the brake pressure p in the hydraulic vehicle brake. In addition, the switching profile SW of a switch for switching the electromechanical wheel brake device on and off is shown. FIG. 4 concerns a release process with a reduction of the clamping force $F_{K1}$.

The release request is imparted by means of the switch SW. At the point in time $t_F$, the force reduction phase starts with a reduction of the clamping force $F_{K1}$ to the value zero. By the displacement of the brake piston towards the initial position, the volume in the hydraulic brake circuit is reduced, which according to the dashed line is accompanied by a rise of the brake pressure p.

In order to compensate the rise in the brake pressure, to which a rise in the brake pedal counter force also corresponds, and to set the constant profile of the brake pressure p that is represented by the solid line, an actuator, such as for example a brake force booster, can also be actuated, by means of which the hydraulic brake pressure p is reduced.

The modulation of the brake pressure to adjust a target brake pedal counter force can also be carried out as a non-constant profile of the brake pressure rather than as a constant profile. It is thereby possible to produce a suitable non-constant counter force in the brake pedal, for example a pulsation of the counter force, in order to haptically notify the driver of a change of state in the brake system, for example reaching a defined clamping force level.

What is claimed is:

1. A method for adjusting the brake pedal counter force in a brake system of a vehicle, the brake system including a hydraulic vehicle brake and an electromechanical brake device with an electric brake motor, both the hydraulic vehicle brake and the electromechanical brake device configured to displace a brake piston to produce a braking force, the method comprising:
    simultaneously operating the hydraulic vehicle brake via a brake pedal and the electric brake motor; and
    automatically modulating a hydraulic brake pressure in the hydraulic vehicle brake during the simultaneous operation of the hydraulic vehicle brake and the electromechanical brake device by operating an electrically controlled actuator such that the brake pedal counter force follows a predetermined target profile.

2. The method according to claim 1, wherein the hydraulic brake pressure is modulated so as to compensate for a deviation of the brake pressure that arises due to the displacement of the brake piston produced by the electric brake motor.

3. The method according to claim 1, wherein the brake pedal counter force is held constant.

4. The method according to claim 1, wherein:
    simultaneously operation of the hydraulic vehicle brake includes depressing the brake pedal; and
    the position of the depressed brake pedal is held constant as the brake pedal counter force follows the predetermined target profile.

5. The method according to claim 1, wherein the simultaneous operation of the hydraulic vehicle brake and the automatic modulation of the hydraulic brake pressure in the hydraulic vehicle brake are performed below a speed limit value of the vehicle or with the vehicle at a standstill.

6. The method according to claim 1, wherein the actuator is configured as a hydraulic pump in the hydraulic vehicle brake, the method further comprising operating the hydraulic pump to modulate the hydraulic brake pressure.

7. The method according to claim 6, wherein the hydraulic pump is a hydraulic pump of an electronic stability program.

8. The method according to claim 1, wherein the actuator is configured as the electric brake motor operating as a final control element in the electromechanical brake device, the method further comprising operating the electric brake motor to modulate the hydraulic brake pressure.

9. The method according to claim 1, wherein the target profile of the brake pedal counter force is configured to be predetermined by the driver.

10. The method according to claim 1, further comprising detecting and analyzing the volumetric flow of the hydraulic brake fluid that is produced during operation of the electric brake motor.

11. A regulation or control unit for executing a method to adjust a brake pedal counter force in a brake system of a vehicle, the brake system including a hydraulic vehicle brake and an electromechanical brake device with an electric brake motor, both the hydraulic vehicle brake and the electromechanical brake device configured to displace a brake piston to produce a braking force, the method including:

simultaneously operating the hydraulic vehicle brake via a brake pedal and the electric brake motor, and automatically modulating a hydraulic brake pressure in the hydraulic vehicle brake during the simultaneous operation of the hydraulic vehicle brake and the electromechanical brake device by operating an electrically controlled actuator such that the brake pedal counter force follows a predetermined target profile.

12. A brake system in a vehicle, comprising:

a hydraulic vehicle brake;

an electromechanical brake device with an electric brake motor, both the hydraulic vehicle brake and the electromechanical brake device configured to displace a brake piston to produce a braking force; and a regulation or control unit configured to actuate adjustable components of the brake system in the vehicle by at least:

simultaneously operating the hydraulic vehicle brake via a brake pedal and the electric brake motor, and automatically modulating a hydraulic brake pressure in the hydraulic vehicle brake during the simultaneous operation of the hydraulic vehicle brake and the electromechanical brake device by operating an electrically controlled actuator such that the brake pedal counter force follows a predetermined target profile.

13. The brake system according to claim 12, wherein a vehicle includes the brake system.

* * * * *